United States Patent Office 3,121,013
Patented Feb. 11, 1964

3,121,013
METHOD OF MAKING CONTINUOUS-MIX BREAD
Elmer F. Giabe, Chicago, Ill., assignor to Food Technology, Inc., Chicago, Ill., a corporation of Illinois
No Drawing. Filed Aug. 17, 1961, Ser. No. 132,013
3 Claims. (Cl. 99—90)

This invention relates to food compositions, especially to bread making and more particularly to continuous bread making, usually referred to in the industry as "continuous-mix operations bread" and "batter-mix bread."

Up to the discovery of continuous bread making operations the conventional method of making bread consisted briefly of preparing a sponge dough of the flour, water, yeast, and yeast food. This was fermented for four to five hours during which time the yeast produced certain fermentation products which it has been found are quite responsible for a large part of the flavor of the resulting loaf of bread. The sponge dough is returned to the mixer, where it is mixed with additional flour and water, salt, sugar, lard, and non-fat dry milk. The latter ingredient has generally been used at the rate of approximately 4% to 6% based on the total weight of flour. It furnishes a substantial amount of taste to the loaf of bread. The flavor apparently blends very well with the products of fermentation to give a well rounded tasting loaf.

It has been known for many years that nonfat dry milk when used at levels over 5% in conventional bread produces certain untoward loaf effects. As the amount of nonfat milk is increased the loaf volume tends to diminish appreciably. These effects are noted at even lower levels if the milk has not been properly preheated during the drying operations. The theory is that the milk proteins themselves may actually be interfering substances in the dough structure which is built from flour proteins. Evidently the flour proteins found it difficult to support the foreign milk protein in attempting to build up to a sufficiently firm structure to permit holding proper volumes of gas to give a well rounded loaf of bread.

In the continuous-mix bread operations the sponge fermentation step is completely eliminated. A broth or "brew" is prepared in a tank. This consists of water, sugar, yeast, yeast nutrients, buffering agents and vitamin enrichment agents. A small amount of nonfat dry milk is included. This broth is fermented for 2½ hours at approximately 86° to 93° F. At the end of this period the broth is pumped to a blender or special incorporator where it is mildly mixed with flour, fat, and oxidizing agents in proper proportions. Mixing is on a continuous basis. This loosely mixed batter is then pumped directly to a special mixer where the dough is forced through a relatively narow aperture within which an agitator is operating at high speed. The result of this operation is to thoroughly incorporate all the ingredients and more importantly to completely hydrate and develop the protein or gluten of the flour such that a dough structure is formed within 30 to 80 seconds. This step completely replaces the slow hydration of gluten or protein of the flour during the four to five hour fermentation step in conventional bread. The dough or batter is then immediately extruded directly into bread pans. These are transferred to a conventional proof box operating at approximately 100° F. and 95% relative humidity. After proofing or rising for about one hour, the pans are transferred to a standard baking oven and baked for about 25 minutes. Removal from the pan, cooling, slicing, and wrapping follow in order.

Continuous-mix bread has a very fine close grained, silky texture, but it is very low on flavor. The reason for this is two sources, the first being no long fermentation period wherein the flour and other ingredients are being acted upon by the yeast and the products of yeast fermentation. The second is the lack of nonfat dry milk. It has been found over several years of operations that continuous-mix bread will not stand high levels of nonfat dry milk. Whereas the conventional process bread contains an average of 4% to 6%, continuous-mix bread now conatins less than 1%. This has been the experience in the approximately 100 continuous-mix plants now in operation in the United States.

Any attempt to increase the nonfat dry milk level over 1% results in bread with exceedingly low volume and very weak side walls. When such bread containing 3% or 4% of millk is put through the slicing and wrapping procedures, the result is loaves of bread which develop concave sides along with very low loaf volume and, therefore, slack-filled packages. Those bakers making use of the continuous-mix operations have reduced the nonfat milk level to 1% or lower with regret since this step naturally augments an already poor flavor situation. Since the continuous-mix operation is geared to short fermentation any method by which more milk can be used would obviously benefit the taste of the bread.

One of the objects of the present invention is to provide a new and improved process for improving the flavor of bread made by a continuous process while retaining the other desirable properties and improving the quality of such bread.

A further object is to provide a new and improved process for incorporating nonfat dry milk into continuous-mix bread in larger quantities than heretofore used.

Another object is to provide new and useful compositions. Other objects will appear hereinafter.

In accordance with this invention, it has been found that nonfat dry milk can be incorporated into bread in a continuous bread making process by first intimately mixing the nonfat dry milk with hydroxylated phosphatide, commonly known as hydroxylated lecithin, preferably with the addition of a vegetable and/or animal fat (shortening), and then adding the mixture to the ingredients used in forming the dough in a continuous bread making process.

The hydroxylated phosphatides are made by treating phosphatides under conditions that bring about hydroxylation of the phosphatide. Phosphatides have the general formula

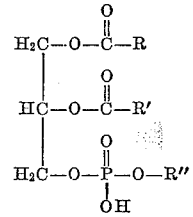

where R and R' are the hydrocarbon radicals of the higher fatty acids, some of which are unsaturated and R" is either a choline radical, a cholamine radical or a serine radical. The phosphate radical may occupy either the alpha or beta position. In the lecithins, R" is the choline radical, and in the cephalines R" is the cholamine radical.

It has been found that hydroxylation of such molecules at a double bond of the unsaturated fatty acids can be accomplished by treating the phosphatides with hydrogen peroxide, preferably in the presence of a water soluble aliphatic carboxylic acid, e.g., acetic, lactice, citric, tartaric, and the like, or with the peracids of such water soluble aliphatic carboxylic acids, e.g., peracetic, perlactic, and the like. Mineral acids such as sulfuric and phosphoric acids can also be used. As indicated, it is preferred to treat either with a mixture of hydrogen peroxide and edible acids or with the peracid of an edible acid since the reaction is more economical and a greater degree of hydroxylation can be obtained. However, hydrogen peroxide alone produces beneficial results. When acid conditions are employed, it is preferred not to use such an amount as will result in a pH value below 3 for a 1% aqueous solution of the mixture, since the phosphatides are easily decomposed under severe acid conditions. Greater amounts of acid may be used, however, where a greater degree of hydroxylation and water solubility are desired, although there is the danger of some decomposition taking place.

The resulting product has a decreased unsaturation as measured by the iodine value, indicating hydroxylation. The product has been hydrolyzed and acetyl values determined on the fatty acids recovered. These show a substantial increase in acetyl values over the acids recovered from the untreated phosphatides, and clearly indicate that hydroxylation occurs on the fatty acid portion. Dihydroxystearic acid has also been recovered from the hydrolysate of the treated material.

According to one method of procedure in preparing the hydroxylated phosphatides, the phosphatide is mixed with an acid, preferably an edible acid such as acetic acid, and warmed to a temperature above about 40° C., but below the temperature at which substantial decomposition of the phosphatide occurs. This latter temperature can readily be determined by routine experiment but in practice it is preferable not to heat the mixture above about 70° C. If crude soybean lecithin is used as the phosphatide it can be heated until it melts. The mixture of the phosphatide and acid is then mixed with hydrogen peroxide with agitation while maintaining a temperature below the decomposition temperature of the phosphatide. Thereafter it is desirable to neutralize the resultant product with an alkali, preferably sodium hydroxide. Finally, the product is dried under vacuum or in any other suitable manner. If the product is not neutralized at least a portion of the hydroxyl groups will be esterified by the acid used to accelerate and increase the extent of the hydroxylation. The preferred practice of the invention is to neutralize the product in order to remove any excess hydrogen peroxide and at the same time the neutralization hydrolyzes the ester groups to produce hydroxylated phosphatides in which hydroxyl groups are on adjacent carbon atoms of the fatty acid portion of the phosphatide. These products have proved to be especially valuable in the practice of the invention.

The preparation of hydroxylated phosphatides is described in several patents, including, for example, Wittcoff, U.S. Patent 2,445,948, and Julian et al., U.S. Patent 2,629,662. The use of hydroxylated phosphatides in the preparation of bakery products from fermented doughs is described in U.S. Patent 2,827,378.

A preferred composition for use in the practice of the invention hereinafter called Composition A consists of 40% by weight hydroxylated lecithin
10% by weight hydrogenated vegetable and/or animal fat
50% by weight nonfat dry milk The hydroxylated lecithin should preferably meet the following requirements:

(a) Acetone insoluble—60% minimum
(b) Petroleum ether insoluble—1.0% maximum
(c) Acid value—34.0 maximum
(d) Iodine value—88.0 maximum
(e) Acetyl value of the separated fatty acid fraction—33 to 38
(f) Peroxide number—100 maximum
(g) Moisture—2% maximum
(h) pH 4.7—4.9

A preferred way of preparing the product for use in continuous bread making is to first mix the hydroxylated lecithin and the fat together by warming both materials sufficiently to bring about a thorough blending. This mix is then introduced with agitation into liquid skim milk at approximately room temperature (70° F.) to 120° F. After the lecithin-fat mixture has been completely suspended in the liquid skim milk, the entire mixture is put through a standard homogenizer at 2000 to 3000 pounds pressure. Immediately upon coming from the homogenizer the dispersion is pumped to a standard spray dryer commonly used for making spray dried milk products in which the composition is dried. The resulting product has a moisture content of approximately 1.5% and is a powdered material somewhat reminiscent of dehydrated whole milk powder. The resulting product represents a phase-change product in which the nonfat milk solids previously having been suspended in water are now dispersed in the oily phase consisting of hydroxylated lecithin and its carrying fat. The mixture is immediately dispersible in water and is a very active form of the hydroxylated lecithin, and as such has very superior emulsifying properties, among other characteristics.

The invention will be further illustrated but is not limited by the following example in which the quantities are stated in parts by weight unless otherwise indicated.

*Example*

(a) Standard formula (control). The following formula was being used in the production of standard white bread in a continuous-mix bread operation. The broth formula consisted of the following:

| Ingredients— | lbs. |
|---|---|
| Water | 925.00 |
| Yeast | 43.00 |
| Yeast food | 14.75 |
| Buffering salts | 2.40 |
| Sodium chloride | 32.00 |
| Dextrose | 142.00 |
| Nonfat dry milk | 14.30 |
| Calcium propionate | 3.00 |
| Vitamin enrichment | (¹) |
| 120 grain vinegar, added after fermentation | 8.00 |

¹ 14 tablets.

Fermentation _____hours__ 2.5
Temperature at the setting of the broth _____° F__ 86
Temperature after fermentation _____° F__ 93

This entire broth was used for 1425 pounds of flour. This makes the milk level used on the basis of flour 1.0%. Similarly, the amount of actual water used was 67.0%.

The bread being produced has a good volume and close grain, but lacked flavor.

(b) The same formula was used for the broth as in (a) except that the milk powder used was increased to 28.6 pounds or 2% based on flour weight. In addition, 0.5% of Composition A was added to the broth and 1425 pounds of water making the actual absorption of the dough 68.0%.

The bread resulting from this test had a good volume and showed no tendency to develop weak side wall structure in the loaves.

(c) Another preparation was made similar to (b) except that 3% of milk was used (42.6 pounds per batch). The results of this test was bread with good volume, showing no reduction whatsoever from the control, and indicating good firm side wall structure. In this case, as in (b), the proof time, the time required for the dough to rise in the pan after coming from the mixer-extruder, before baking in the oven, was normal, that is the same time as the control, 76 minutes.

(d) Another preparation was made repeating (c) except that the water absorption was reduced to 67%. The results again were bread with good volume, firm side walls, and the good flavor of bread containing appreciable quantities of milk.

(e) Another preparation was made similar to (b) except that 4% of nonfat dry milk was used along with 0.63% of Composition A. In this preparation the milk was added at the beginning of the fermentation and Composition A was added at the end of the fermentation period. This run was made over a period of several hours of operations to establish the results of the baking test. The resulting loaves had normal volume, good side wall structure, and good flavor.

It is to be noted that the total milk level in this example was 4.31%, which includes the nonfat dry milk in Composition A. Since the run was of considerable duration and since all of the loaves produced were of good structure and firmness, there was no doubt but that Composition A had a definite effect on the dough structure, which permits it to support these levels of milk.

It appears that the highly dispersed hydroxylated lecithin performs some function in strengthening the flour proteins so that the structure which is responsible for the loaf characteristics is not impaired. The highly dispersed hydroxylated lecithin could be increasing the rate of hydration of the gluten or protein so that the strands adhere more closely to each other even though the time of hydration is only approximately one minute of mixing in a continuous-mix mixer. The conventionally made bread permits 4 to 5 hours of fermentation during which the gluten is slowly hydrated assisted by the action of the products of fermentation, notably acidity. This bread permits 5% of nonfat dry milk to be used without any loss in loaf volume or defects in structure apparent up to this level of milk.

Again, hypothetically, the fat used in bread making may be interfering with the gluten hydration by causing a film of fat to form over the gluten. It does not follow, however, that a mere emulsifier of any type makes a difference since in all of the above experiments 3% of lard and .75% of mono and diglycerides emulsifier had been employed; increasing or decreasing the mono and diglycerides had no effect in improving the ability to use large quantities of milk with this process. This has been experience of long standing. It would seem, therefore, that the hydroxylated lecithin in the dispersed form has a specific action on the dough which probably relates to gluten hydration rate.

In general, excellent results are obtained with .05 to .4% by weight of hydroxylated phosphatide based on the weight of flour used in continuous bread making. These percentages refer to the hydroxylated phosphatide per se and do not include the carrier on which it is dispersed. The compositions including the carrier preferably contain 10–50% by weight hydroxylated phosphatide
5–15% by weight shortening
40–60% by weight nonfat dry milk By the practice of the invention a total of 2–6% by weight of nonfat milk can be incorporated into the continuous process bread to improve the taste and quality without adversely affecting the physical characteristics of the bread.

The invention is hereby claimed as follows:

1. A method of making continuous-mix bread which comprises incorporating with a continuous bread making mix nonfat dry milk in amounts from 2% to 6% by weight of the flour in said mix and 0.05% to 0.4% by weight of hydroxylated phosphatide based on the weight of the flour, and baking a dough formed from said mix.

2. A method of making continuous-mix bread which comprises incorporating with a continuous bread making mix a composition consisting essentially of hydroxylated phosphatide homogeneously dispersed with shortening and nonfat dry milk, the proportion of said composition added to said mix being sufficient to give a total of 0.05% to 0.4% by weight of hydroxylated phosphatide based on the weight of the flour in said mix, adding sufficient additional nonfat dry milk to said mix to give a total of 2% to 6% by weight based on the weight of the flour of nonfat dry milk in said mix including the nonfat dry milk in said composition, and baking a dough formed from said mix.

3. A method of making continuous-mix bread which comprises incorporating with a continuous bread making mix 0.5% to 0.62% by weight based on the weight of flour in said mix of a composition consisting essentially of 40% by weight hydroxylated lecithin, 10% by weight shortening and 50% by weight nonfat dry milk homogenized together and baking a dough formed from said mix.

References Cited in the file of this patent

UNITED STATES PATENTS

| | | |
|---|---|---|
| 2,392,833 | Chapin | Jan. 15, 1946 |
| 2,431,498 | North et al. | Nov. 25, 1947 |
| 2,445,948 | Wittcoff | July 27, 1948 |
| 2,629,662 | Julian et al. | Feb. 24, 1953 |
| 2,827,378 | Glabe | Mar. 18, 1958 |

OTHER REFERENCES

"Bakers Weekly," May 16, 1960, pp. 33 to 36, 74.